(12) United States Patent
Strangman

(10) Patent No.: US 8,449,262 B2
(45) Date of Patent: May 28, 2013

(54) NICKEL-BASED SUPERALLOYS, TURBINE BLADES, AND METHODS OF IMPROVING OR REPAIRING TURBINE ENGINE COMPONENTS

(75) Inventor: Tom Strangman, Prescott, AZ (US)

(73) Assignee: Honeywell International Inc., Morristown, NJ (US)

( * ) Notice: Subject to any disclaimer, the term of this patent is extended or adjusted under 35 U.S.C. 154(b) by 816 days.

(21) Appl. No.: 12/633,199

(22) Filed: Dec. 8, 2009

(65) Prior Publication Data
US 2011/0135489 A1    Jun. 9, 2011

(51) Int. Cl.
*F01D 5/28* (2006.01)

(52) U.S. Cl.
USPC ....... 416/241 R; 148/410; 148/428; 428/680; 420/448; 420/450; 420/451

(58) Field of Classification Search
USPC ............... 416/241 R; 148/410, 428; 428/680; 420/445–451
See application file for complete search history.

(56) References Cited

U.S. PATENT DOCUMENTS

| | | | |
|---|---|---|---|
| 4,764,225 A | 8/1988 | Shankar et al. | |
| 4,818,833 A | 4/1989 | Formanack et al. | |
| 4,885,216 A | 12/1989 | Naik | |
| 5,077,141 A * | 12/1991 | Naik et al. | 428/680 |
| 5,395,584 A | 3/1995 | Berger et al. | |
| 6,355,086 B2 | 3/2002 | Brown et al. | |
| 6,565,680 B1 | 5/2003 | Jackson et al. | |
| 6,740,292 B2 | 5/2004 | Arrell et al. | |
| 6,811,379 B2 | 11/2004 | Fernihough et al. | |
| 6,818,321 B2 | 11/2004 | Okazaki et al. | |
| 6,972,390 B2 | 12/2005 | Hu et al. | |
| 6,979,498 B2 | 12/2005 | Darolia et al. | |
| 7,261,783 B1 | 8/2007 | MacKay et al. | |
| 7,264,888 B2 | 9/2007 | Darolia et al. | |
| 2004/0234410 A1 | 11/2004 | Shipton et al. | |
| 2006/0239852 A1 | 10/2006 | Shipton et al. | |
| 2008/0101981 A1 * | 5/2008 | Arrell et al. | 420/443 |
| 2009/0274927 A1 * | 11/2009 | Narita | 428/652 |
| 2009/0274928 A1 * | 11/2009 | Harada et al. | 428/680 |
| 2010/0092302 A1 * | 4/2010 | Sato et al. | 416/241 R |

* cited by examiner

*Primary Examiner* — Ninh H Nguyen
(74) *Attorney, Agent, or Firm* — Ingrassia Fisher & Lorenz, P.C.

(57) ABSTRACT

Nickel-based superalloys, turbine blades, and methods of improving or repairing turbine engine components are included. A nickel-based superalloy includes, by weight, about 5% to about 12% cobalt, about 3% to about 10% chromium, about 5.5% to about 6.3% aluminum, about 5% to about 10% tantalum, about 3% to about 10% rhenium, about 2% to about 5% of one or more of elements selected from a group consisting of platinum, ruthenium, palladium, and iridium, about 0.1% to about 1.0% hafnium, about 0.01% to about 0.4% yttrium, about 0.01% to about 0.15% silicon, and a balance of nickel.

20 Claims, 3 Drawing Sheets

NICKEL-BASED SUPERALLOYS, TURBINE BLADES, AND METHODS OF IMPROVING OR REPAIRING TURBINE ENGINE COMPONENTS

TECHNICAL FIELD

The inventive subject matter generally relates to turbine engine components, and relates to nickel-based superalloys for improving or repairing turbine engine components.

BACKGROUND

Turbine engines are used as the primary power source for various kinds of aircraft. The engines may also serve as auxiliary power sources that drive air compressors, hydraulic pumps, and industrial electrical power generators. Most turbine engines generally follow the same basic power generation procedure. Compressed air is mixed with fuel and burned, and the expanding hot combustion gases are directed against stationary turbine vanes in the engine. The vanes turn the high velocity gas flow partially sideways to impinge onto turbine blades mounted on a rotatable turbine disk. The force of the impinging gas causes the turbine disk to spin at high speed. Jet propulsion engines use the power created by the rotating turbine disk to draw more air into the engine, and the high velocity combustion gas is passed out of the gas turbine aft end to create forward thrust. Turbine engines are also used to drive one or more propellers, electrical generators, or other devices.

Turbine engine blades and vanes are fabricated from high temperature materials such as nickel-based superalloys. Although nickel-based superalloys have good high temperature properties and many other advantages, they may be susceptible to corrosion, oxidation, thermal fatigue, and erosion damage in the harsh environment of an operating turbine engine. These limitations may be undesirable as there is a constant drive to increase engine operating temperatures in order to increase fuel efficiency and to reduce emission. Replacing damaged turbine engine components made from nickel-based superalloys may be relatively expensive. Hence, significant research is being performed to find cost-effective ways to improve the temperature properties of these components as well as facilitate their repair.

Accordingly, there is a need for methods and materials for improving and repairing turbine engine components such as turbine blades and vanes. There is a particular need for environment-resistant materials that will improve a turbine component's durability, and for efficient and cost effective methods of repairing the components using such materials. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Nickel-based superalloys, turbine blades, and methods of improving or repairing turbine blades are provided.

In an embodiment, by way of example only, a nickel-based superalloy includes, by weight, about 5% to about 12% cobalt, about 3% to about 10% chromium, about 5.5% to about 6.3% aluminum, about 5% to about 10% tantalum, about 3% to about 10% rhenium, about 2% to about 5% of one or more of elements selected from a group consisting of platinum, ruthenium, palladium, and iridium, about 0.1% to about 1.0% hafnium, about 0.01% to about 0.4% yttrium, about 0.01% to about 0.15% silicon, and a balance of nickel.

In another embodiment, by way of example only, a single crystal turbine blade includes a nickel-based superalloy including about 5% to about 12% cobalt, by weight, about 3% to about 10% chromium, by weight, about 5.5% to about 6.3% aluminum, by weight, about 5% to about 10% tantalum, by weight, about 3% to about 10% rhenium, by weight, about 2% to about 5% of one or more of elements selected from a group consisting of platinum, ruthenium, palladium, and iridium, by weight, about 0.1% to about 1.0% hafnium, by weight, about 0.01% to about 0.4% yttrium, by weight, about 0.01% to about 0.15% silicon, by weight, and a balance of nickel.

In still another embodiment, by way of example only, a method of improving or repairing a turbine blade includes applying a nickel-based superalloy over an area of the blade, the nickel-based-superalloy including, by weight, about 5% to about 12% cobalt, about 3% to about 10% chromium, about 5.5% to about 6.3% aluminum, about 5% to about 10% tantalum, about 3% to about 10% rhenium, about 2% to about 5% of one or more of elements selected from a group consisting of platinum, ruthenium, palladium, and iridium, about 0.1% to about 1.0% hafnium, about 0.01% to about 0.4% yttrium, about 0.01% to about 0.15% silicon, and a balance of nickel.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

An improved, nickel-based superalloy is provided that may have superior elevated-temperature properties over those of conventional superalloys. In an embodiment, the nickel-based superalloy has improved oxidation-resistance when exposed to engine operating temperatures, such as turbine inlet temperatures greater than about 2200° F. (1205° C.). In an example, the nickel-based superalloy may have improved properties, such as resistance to creep, oxidation, thermal fatigue, and other hazards when used for high pressure turbine (HPT) components such as turbine blades and vanes.

Figure 1:
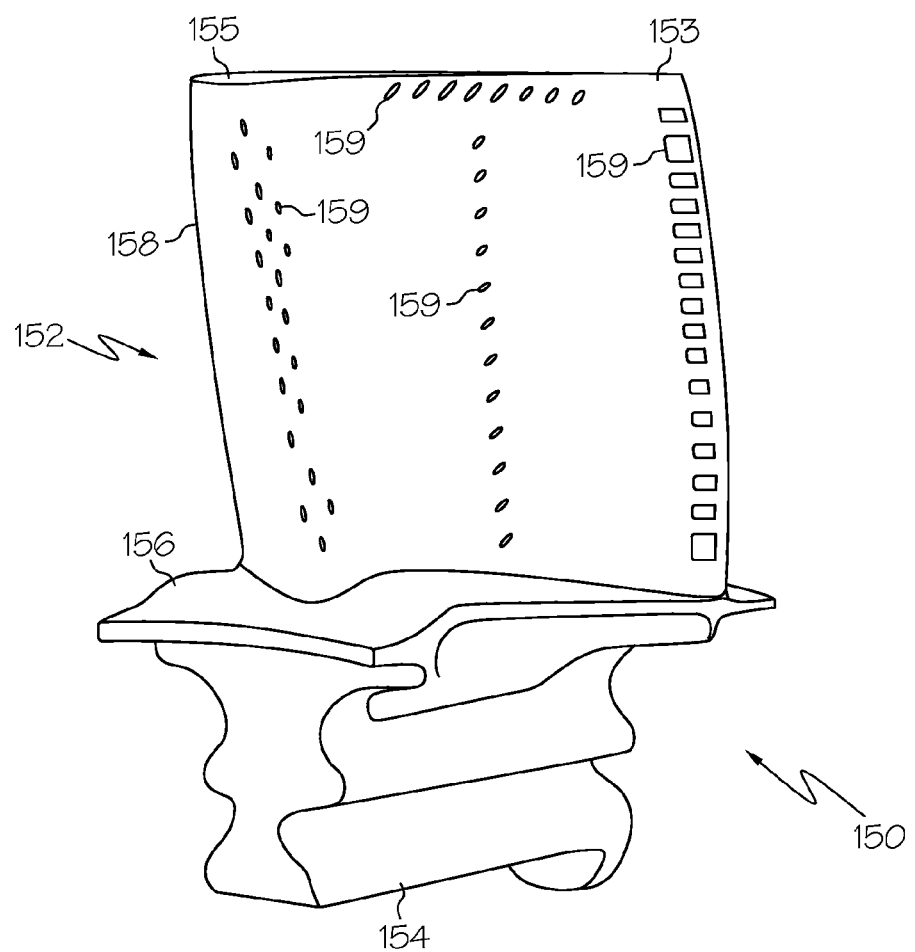
FIG. 1 is a perspective view of a turbine engine component, according to an embodiment.

FIG. 1 is a perspective view of a turbine engine component 150, according to an embodiment. Here, the turbine engine component 150 is shown as a turbine blade. However, in other embodiments, the turbine engine component 150 may be a turbine vane or other component that may be implemented in a gas turbine engine, or other high-temperature system. In an embodiment, the turbine engine component 150 may include an airfoil 152 that includes a pressure side surface 153, an attachment portion 154, a leading edge 158 including a blade tip 155, and/or a platform 156. In accordance with an embodiment, the turbine engine component 150 may be formed with a non-illustrated outer shroud attached to the tip 155. The turbine engine component 150 may have non-illustrated internal air-cooling passages that remove heat from the turbine airfoil. After the internal air has absorbed heat from the blade, the air is discharged into a hot gas flow path through passages 159 in the airfoil wall. Although the turbine engine component 150 is illustrated as including certain parts and having a particular shape and dimension, different shapes, dimensions and sizes may be alternatively employed depending on particular gas turbine engine models and particular applications.

Figure 2:
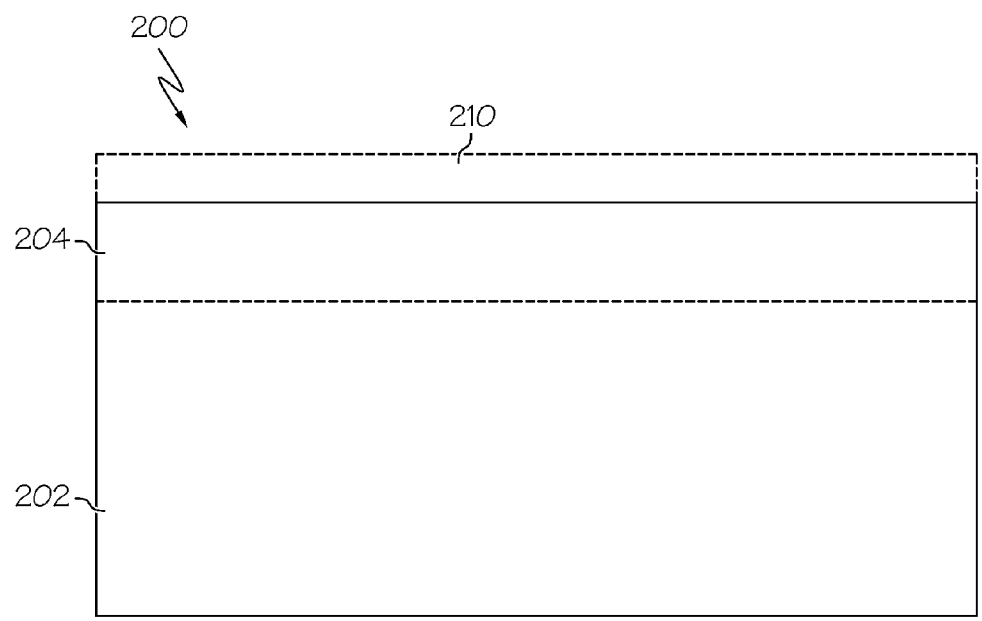
FIG. 2 is a cross-sectional view of a portion of a turbine engine component, according to an embodiment.

FIG. 2 is a cross-sectional view of a portion of an improved turbine engine component 200, according to an embodiment. The portion may be included on the tip of a blade, in an embodiment. In another embodiment, the portion may be included on the blade platform. In any case, the turbine engine component 200 may include a base material 202 and an enhanced portion 204 comprised of the improved, nickel-based superalloy. Though a dotted line is shown between the base material 202 and the enhanced portion 204, it will be appreciated that in an embodiment, an interface between the alloys of the base material 202 and the enhanced portion 204 may be seamless and may be a metallurgical bonding or a metallurgical interface. In some embodiments, as shown in phantom, a protective coating system 210 may be deposited over the turbine engine component 200.

In an embodiment, the base material 202 comprises a first nickel-based superalloy. For example, the first nickel-based superalloy may be selected from a high performance nickel-based superalloy, including, but not limited to IN792, C101, MarM247, Rene80, Rene125, ReneN5, SC180, CMSX4, and PWA1484. The base material 202 may have a single crystal microstructure, in an embodiment. In other embodiments, the base material 202 may comprise a directionally solidified or an equiaxed microstructure.

The enhanced portion 204 includes a second nickel-based superalloy having a composition that may or may not be different than the composition of the first nickel-based superalloy. Generally, in an embodiment, the second nickel-based superalloy includes elements selected from nickel, cobalt, chromium, aluminum, tantalum, rhenium, platinum, ruthenium, hafnium, silicon, and yttrium. In other embodiments, in addition to the previously-mentioned elements, the second nickel-based superalloy may include one or more elements selected from titanium, niobium, carbon, boron, and zirconium. In yet another embodiment, the nickel-based superalloy further may include molybdenum and tungsten. In still another embodiment, the nickel-based superalloy may include incidental impurities (e.g., trace amounts of additional elements that are not intentionally included in the composition), but does not include other elements other than those listed previously.

In accordance with an embodiment, the second nickel-based superalloy includes about 5% to about 12% cobalt, about 3% to about 10% chromium, about 5.5% to about 6.3% aluminum, about 5% to about 10% tantalum, about 3% to about 10% rhenium, about 2% to about 5% of one or more of elements selected from a group consisting of platinum, ruthenium, palladium, and iridium, about 0.1% to about 1.0% hafnium, about 0.01% to about 0.4% yttrium, about 0.01% to about 0.15% silicon, and a balance of nickel. According to another embodiment, cobalt may be present, by weight, in a range of about 7% to about 12%. According to another embodiment, ruthenium may be present, by weight, in a range of about 0.1% to about 3%. In another embodiment, the second nickel-based superalloy optionally or additionally may include up to about 2%, by weight, of titanium and niobium. In still another embodiment, the second nickel-based superalloy optionally or additionally may include, by weight, up to about 0.1% carbon. In still yet another embodiment, the second nickel-based superalloy optionally or additionally may include, by weight, up to about 0.1% zirconium. In still another embodiment, the second nickel-based superalloy optionally or additionally may include up to about 1%, by weight, of molybdenum and tungsten.

Cobalt is included to improve the microstructural stability of the alloy with respect to inhibiting the formation of topologically close packed (TCP) phases. Chromium is included to enhance the alloy's oxidation resistance. Inclusion of aluminum promotes formation of a gamma prime strengthening phase and formation of a protective aluminum oxide layer on a surface of the enhanced portion 204. The protective oxide layer protects the outer surface of the enhanced portion 204 against oxidation. Tantalum may partition into gamma prime phase (e.g., segregate into particles within a gamma matrix of the superalloy) to improve the elevated-temperature creep and fatigue resistance properties of the nickel-based superalloy. Rhenium may be included to partition to the gamma matrix of the material to enhance a negative lattice misfit between the gamma matrix and gamma prime phases, which may improve creep resistance of the material. Rhenium may also reduce coarsening of gamma prime phase particles, which may improve the elevated-temperature properties of the alloy.

Hafnium, yttrium, zirconium, and rare earth elements may improve adhesion of the protective oxide layer to the enhanced portion 204. Specifically, the hafnium atoms of the nickel-based superalloy may diffuse into grain boundaries of the aluminum oxide scale that thermally grows very slowly on the surface the nickel-based superalloy of the enhanced portion 204 so that the protective oxide layer remains relatively thin. As a result, spallation of the protective oxide layer may be minimized. Moreover, hafnium, yttrium, and/or other reactive elements such as zirconium or the rare earth elements may be included in the composition of the nickel-based superalloy to tie up the sulfur impurities that may be present in the material of the enhanced portion 204. In particular, yttrium and/or other reactive elements may react with sulfur to form stable oxysulfides or sulfides to prevent the sulfur from diffusing to the surface of the superalloy. This may also improve the adherence of a protective thin layer alumina scale to the alloy. Silicon in the nickel-based superalloy may also contribute to the adhesion protective oxide layer, which may be comprised predominately of alumina.

Precious metal elements, such as ruthenium, platinum, palladium, and iridium, may enhance oxidation resistance of the superalloy and may strengthen the gamma and gamma prime phases of the superalloy. Additionally, they may promote a stronger bond between the superalloy and the thermally grown alumina scale. These large elements may also improve other properties of the superalloy, such as resistance to TCP phase formation and creep resistance.

Titanium and niobium may improve creep strength of the superalloy and reduce superalloy density. However, these elements are preferably minimized because they adversely affect oxidation resistance at higher temperatures.

Carbon and boron may be included to strengthen grain boundaries that may be present in the superalloy when multiple grains are present. Total amounts of these elements are preferably minimized, because inclusion of increased quantities of these elements may adversely affect oxidation resistance at higher temperatures.

Figure 3:
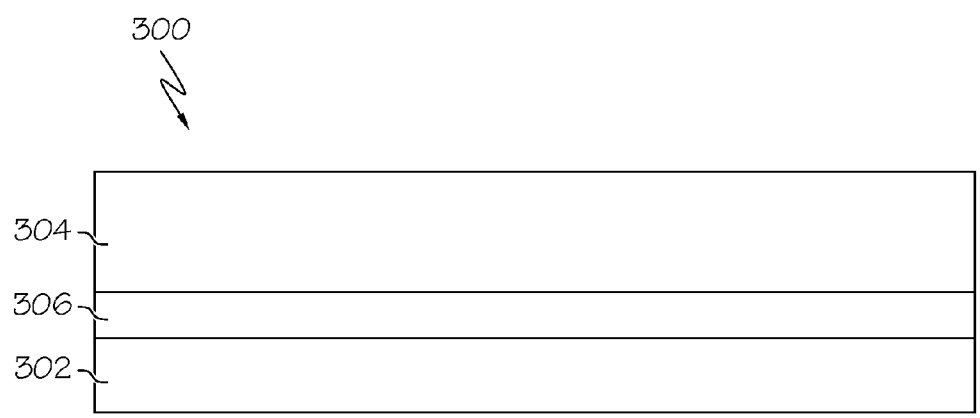
FIG. 3 is a cross-sectional view of a protective coating system that may be included over a turbine engine component, according to an embodiment.

In some embodiments, molybdenum and tungsten may be included in order to improve alloy creep strength properties of the superalloy. These elements are preferably minimized to less than 2%, because inclusion of increased quantities of these elements may adversely affect oxidation resistance at higher temperatures and alloy stability. To further protect the turbine engine component 200 which may be exposed to the harsh operating temperatures, the protective coating system 210 may be included, in an embodiment. FIG. 3 is a cross-sectional view of a protective coating system 300 that may be included over a turbine engine component, according to an embodiment. The protective coating system 300 may include a bond coating 302, a thermal barrier coating 304, and one or more intermediate layers therebetween, such as a thermally grown oxide (TGO) 306. In one embodiment, the bond coating 302 may be a diffusion aluminide coating. For example, the diffusion aluminide coating may be formed by depositing an aluminum layer over the base material 202 (FIG. 2) and the restored portion 204 (FIG. 2), and subsequently interdiffusing the aluminum layer with the substrate to form the diffusion aluminide coating. In another embodiment, the diffusion aluminide coating may have a more complex structure and may include one or more additional metallic layers that are diffused with the aluminum layer, the base material 202, and/or the portion 204. For example, an additional metallic layer may include a platinum layer.

In another embodiment, the bond coating 302 may be an overlay coating comprising MCrAlX, wherein M is an element selected from cobalt, nickel, or combinations thereof, and X is one or more elements selected from hafnium, zirconium, yttrium, tantalum, palladium, platinum, silicon, or combinations thereof. Some examples of MCrAlX compositions include NiCoCrAlY and CoNiCrAlY. In still another embodiment, the bond coating 302 may include a combination of two types of bond coatings, such as a diffusion aluminide coating formed on an MCrAlX coating. In any case, the bond coating 302 may have a thickness in a range of from about 25 microns ($\mu$m) to about 150 $\mu$m, according to an embodiment. In other embodiments, the thickness of the bond coating 302 may be greater or less.

The thermal barrier coating 304 may be formed over the bond coating 302 and may comprise, for example, a ceramic. In one example, the thermal barrier coating 304 may comprise a partially stabilized zirconia-based thermal barrier coating, such as yttria stabilized zirconia (YSZ). In an embodiment, the thermal barrier coating may comprise yttria stabilized zirconia doped with other oxides, such as $Gd_2O_3$, $TiO_2$, and the like. In another embodiment, the thermal barrier coating 304 may have a thickness that may vary and may be, for example, in a range from about 50 $\mu$m to about 300 $\mu$m. In other embodiments, the thickness of the thermal barrier coating 304 may be in a range of from about 100 $\mu$m to about 250 $\mu$m. In still other embodiments, the thermal barrier coating 304 may be thicker or thinner than the aforementioned ranges.

The thermally-grown oxide layer 306 may be located between the bond coating 302 and the thermal barrier coating 304. In an embodiment, the thermally-grown oxide layer 306 may be grown from aluminum in the above-mentioned materials that form the bond coating 302. For example, during the deposition or a subsequent heat treatment of the thermal barrier coating 304, oxidation may occur on the bond coating 302 to result in the formation of the oxide layer 306. In one embodiment, the thermally-grown oxide layer 306 may be relatively thin, and may be less than 2 $\mu$m thick.

Figure 4:
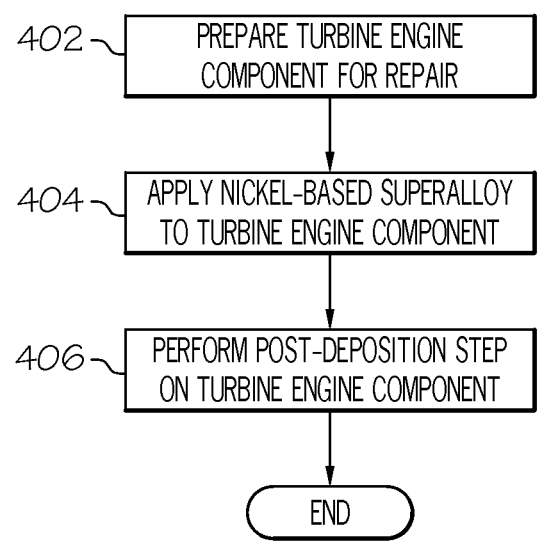
FIG. 4 is flow diagram of a method of improving or repairing a turbine engine component, according to an embodiment.

To improve or repair a turbine engine component, a method 400, depicted in a flow diagram provided in FIG. 4, may be employed. Although the following method 400 is described with reference to repair of a turbine blade, it should be understood that the method 400 is not limited to blades or any other particular components. According to an embodiment, the turbine engine component is prepared for repair, step 402. In an embodiment, step 402 may include chemically preparing the surface of the turbine engine component at least in proximity to and/or on surfaces defining the structural feature. For example, in an embodiment in which the turbine engine component includes an outer environment-protection coating, the coating may be removed. Thus, a chemical stripping solution may be applied to a surface of the turbine engine component, such as the surfaces and portions of the component surrounding and/or defining the structural feature. Suitable chemicals used to strip the coating may include, for example, nitric acid solution. However, other chemicals may alternatively be used, depending on a particular composition of the coating.

In another embodiment of step 402, the turbine engine component may be mechanically prepared. Examples of mechanical preparation include, for example, pre-repair machining and/or degreasing surfaces in proximity to and/or defining the structural feature in order to remove any oxidation, dirt or other contaminants. In another embodiment, additional or different types and numbers of preparatory steps can be performed. It will be appreciated that the present embodiment is not limited to these preparatory steps, and that additional, or different types and numbers of preparatory steps can be conducted.

Once the turbine engine component has been prepared, a nickel-based superalloy may be applied thereto, step 404. In an embodiment, the nickel-based superalloy may be laser-welded onto the damaged area. In an example, the nickel-based superalloy may comprise any one of the above-described superalloy compositions used for an improved or repaired portion (e.g., portion 204 in FIG. 2) of a turbine blade. The nickel-based superalloy may be provided as substantially spherical powder particles, which provide improved powder flow property and may help maintain a stable powder feed rate during a laser deposition process. According to an embodiment, the spherical powder particles may have an average diameter in a range of about 5 microns to about 50 microns. In other embodiments, the average diameters may be smaller or greater than the aforementioned range. In an embodiment, the spherical powder particles may be prepared by vacuum or inert-gas atomization.

To laser-weld the nickel-based superalloy to the component, the nickel-based superalloy powder may be used in conjunction with a $CO_2$ laser, a YAG laser, a diode laser, or a fiber laser. In an embodiment, a welding process includes laser powder fusion welding, in which the nickel-based superalloy is laser deposited onto a degraded area to restore both geometry and dimension with metallurgically sound buildup. Both automatic and manual laser welding systems are widely used to perform laser powder fusion welding processes. An exemplary manual welding repair is described in detail in U.S. Pat. No. 6,593,540 entitled "Hand Held Powder-Fed Laser Fusion Welding Torch" and incorporated herein by reference.

In accordance with an embodiment in which the component comprises a directionally solidified or single crystal microstructure, the powder particles may be deposited over the degraded area, and a laser may be employed to melt the powder particles and an underlying portion of the component.

The melted powder particles and melted portion of the component may solidify into a layer with a directionally solidified microstructure or single crystal microstructure having at least a predetermined primary orientation. As used herein, the term "predetermined primary orientation" may be defined as a direction perpendicular to a crystal lattice plane of a component. In an embodiment, the predetermined primary orientation in a component comprising a nickel-based superalloy may be denoted as a [001] direction. In an embodiment, the component may serve as the seed crystal, and the desired orientation may be in a direction that provides the component with improved creep strength and/or improved thermal fatigue strength. Hence, the improved or restored portion may grow epitaxially from the crystal structure of the component to form an extension of the single crystal microstructure of the component.

According to another embodiment, the component to be improved or repaired component may comprise a doubly-oriented single crystal including a gamma matrix and gamma prime particles. In such an embodiment, the component may have a predetermined primary orientation and a predetermined secondary orientation. The term "predetermined secondary orientation" may be defined as a second direction of a crystal lattice of the seed crystal (or component), in an embodiment. In an embodiment, the predetermined secondary orientation may be denoted as a [100] direction, which is orthogonal to the [001] crystallographic direction. In an embodiment, the attachment section of a blade may comprise the predetermined secondary orientation and may extend axially outward relative to the blade airfoil and along a second primary axis of the crystal lattice. Thus, orientation of the attachment section may occur in a [100] direction substantially parallel to the second primary axis and may improve the creep and fatigue strength of the component. Although the predetermined primary and secondary orientations are depicted as a [001] direction and a [100] direction respectively, a [100] direction may represent the predetermined primary orientation or a [001] direction may represent the predetermined secondary orientation, in other embodiments. In still other embodiments, either the predetermined primary or secondary orientation may be another crystallographic direction.

In any case, a piece may be cast from the nickel-based superalloy, such that the piece includes the predetermined primary and second orientations that are approximately equivalent to those of the component. In an embodiment, the piece may be a tip for a blade. In another embodiment, a particular shape and dimension of the improved or repair tip may be dependent upon a desired shape of the blade tip. After casting, the piece may be subjected to a solution heat treatment above the gamma prime solvus temperature of the nickel-based superalloy for a period in a range of about 1 to 10 hours. In other embodiment, the solution heat treatment may be longer or shorter than the aforementioned time period. The piece is then cooled to room temperature (e.g., about 20° C. to about 25° C.) in an embodiment. In an embodiment, the piece may be cooled to room temperature at a rate of about 50° C. per minute. In other embodiment, cooling may occur within a longer or shorter time period. By cooling the piece in a relatively short time period, an array of cuboidal gamma prime phase particles may precipitate within the gamma nickel matrix, which may enhances creep strength of the repair tip. The piece may be machined to a desired shape and dimension and the predetermined primary and secondary orientation of the repair tip may be aligned with that of the component. The piece may be diffusion bonded to the component. In an embodiment, if the piece comprises a tip, the tip may be diffusion bonded to the blade.

Returning to the flow diagram of FIG. 4, after the application step 404 is completed, at least one post-deposition step is performed on the turbine engine component, step 406. A particular post-deposition step may depend on the type of application process that was performed in step 404. In an embodiment, the post-deposition step 406 can further include additional processes that improve the mechanical properties and metallurgical integrity of the turbine engine component. Such processes may include final machining the repaired turbine engine component to a design dimension. Other processes include coating the turbine engine component with a suitable coating material such as environment-resistant diffusion aluminide and/or MCrAlY overlay coatings, coating diffusion, and aging heat treatments to homogenize microstructures and improve performance of the turbine airfoils.

Exemplary alloy compositions P and Q are provided in Table 1 and compared with the conventional SC180 single crystal turbine blade material. These exemplary alloys have compositions tailored for both improved resistance to cyclic oxidation and creep, relative to SC180. At 1100C/137 MPa, the creep lives of the exemplary single crystal alloys are estimated to be more than 4 times greater than that of SC180. This combination of improved properties is expected to improve the oxidation and thermal fatigue life of turbine blade tips. Formulations for each nickel-based superalloy composition are included in Table 1, by weight:

TABLE 1

| Blade tip alloy | Ni | Co | Cr | Mo | W | Ta | Al | Ti | Re | Y | Hf | Si | Pt | Ru | Estimated single crystal 1100 C./137 MPa rupture life, hours |
|---|---|---|---|---|---|---|---|---|---|---|---|---|---|---|---|
| SC180 | Bal | 10.0 | 5.0 | 1.7 | 5.0 | 8.5 | 5.5 | 0.8 | 3.0 | 0 | 0.1 | 0 | 0 | 0 | 117 |
| Alloy P | Bal | 9.6 | 5.9 | 0 | 0 | 7.0 | 5.9 | 0 | 9.0 | 0.3 | 0.6 | 0.1 | 0 | 2.5 | 496 |
| Alloy Q | Bal | 9.5 | 5.8 | 0 | 0 | 7.0 | 5.9 | 0 | 9.0 | 0.3 | 0.6 | 0.1 | 1.6 | 2.5 | 526 |

A novel nickel-based superalloy and methods for improving or repairing turbine engine components have now been provided. The novel nickel-based superalloy may provide improved oxidation-resistance over conventional nickel-based superalloys when subjected to engine operating temperatures. Additionally, the methods in which the novel nickel-based superalloys are used may be employed not only on blades, but also on other turbine components, including, but not limited to, vanes and shrouds. The method may also improve the durability of the turbine component, thereby optimizing the operating efficiency of a turbine engine, and prolonging the operational life of turbine blades and other engine components. Though the nickel-based superalloy is described above as being used for improvement of turbine blade tips, the superalloy may alternatively be employed for casting new turbine components.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A nickel-based superalloy, comprising, by weight:
   about 7% to about 12% cobalt;
   about 3% to about 10% chromium;
   about 5.5% to about 6.3% aluminum;
   about 5% to about 10% tantalum;
   about 3% to about 10% rhenium;
   about 2% to about 5% of one or more of elements selected from a group consisting of palladium and iridium;
   about 0.1% to about 1.0% hafnium;
   about 0.01% to about 0.4% yttrium;
   about 0.01% to about 0.15% silicon; and
   a balance of nickel.

2. The nickel-based superalloy of claim 1, further comprising up to about 2% of one or more of elements selected from a group consisting of titanium and niobium, by weight.

3. The nickel-based superalloy of claim 1, further comprising up to about 2% of one or more of elements selected from a group consisting of molybdenum and tungsten, by weight.

4. The nickel-based superalloy of claim 1, further comprising up to about 0.1% carbon, by weight.

5. The nickel-based superalloy of claim 1, further comprising up to about 0.1% zirconium, by weight.

6. The nickel-based superalloy of claim 1, wherein the super-alloy comprises powder particles of a spherical shape.

7. The nickel-based superalloy of claim 6, wherein the spherical particles have an average diameter between about 5 micrometers and about 50 micrometers.

8. The nickel-based superalloy of claim 1, consisting of, by weight:
   about 7% to about 12% cobalt;
   about 3% to about 10% chromium;
   about 5.5% to about 6.3% aluminum;
   about 5% to about 10% tantalum;
   about 3% to about 10% rhenium;
   about 2% to about 5% of one or more of elements selected from a group consisting of palladium and iridium;
   about 0.1% to about 1.0% hafnium;
   about 0.01% to about 0.4% yttrium;
   about 0.01% to about 0.15% silicon; and
   a balance of nickel.

9. The nickel-based superalloy of claim 8, wherein the super-alloy consists of powder particles of a spherical shape having an average diameter between about 5 micrometers and about 50 micrometers.

10. A single crystal turbine blade comprising:
    a nickel-based superalloy including:
    about 7% to about 12% cobalt, by weight;
    about 3% to about 10% chromium, by weight;
    about 5.5% to about 6.3% aluminum, by weight;
    about 5% to about 10% tantalum, by weight;
    about 3% to about 10% rhenium, by weight;
    about 2% to about 5% of one or more of elements selected from a group consisting of palladium and iridium, by weight;
    about 0.1% to about 1.0% hafnium, by weight;
    about 0.01% to about 0.4% yttrium, by weight;
    about 0.01% to about 0.15% silicon, by weight; and
    a balance of nickel.

11. The single crystal turbine blade of claim 10, wherein the nickel-based superalloy further comprises up to about 2% of one or more of elements selected from a group consisting of titanium and niobium, by weight.

12. The single crystal turbine blade of claim 10, wherein the nickel-based superalloy further comprises up to about 2% of one or more of elements selected from a group consisting of molybdenum and tungsten, by weight.

13. The single crystal turbine blade of claim 10, wherein the nickel-based superalloy further comprises up to about 0.1% carbon, by weight.

14. The single crystal turbine blade of claim 10, wherein the nickel-based superalloy further comprises up to about 0.1% zirconium, by weight.

15. A method of repairing or improving a turbine engine component, the method comprising the step of:
    applying a nickel-based superalloy over an area of the component, the nickel-based-superalloy including, by weight, about 7% to about 12% cobalt, about 3% to about 10% chromium, about 5.5% to about 6.3% aluminum, about 5% to about 10% tantalum, about 3% to about 10% rhenium, about 2% to about 5% of one or more of elements selected from a group consisting of palladium and iridium, about 0.1% to about 1.0% hafnium, about 0.01% to about 0.4% yttrium, about 0.01% to about 0.15% silicon, and a balance of nickel.

16. The method of claim 15, wherein:
    the step of applying comprises depositing the nickel-based superalloy over the area of the component and melting the nickel-based superalloy and an underlying portion of the component, which solidify to include a directionally-solidified microstructure.

17. The method of claim 15, wherein:
    the step of applying comprises casting a piece from the nickel-based superalloy and diffusion bonding the piece to the component.

18. The method of claim 17, wherein:
    the step of applying further comprises casting a piece from the nickel-based superalloy such that the piece has a predetermined primary orientation that is substantially identical to a predetermined primary orientation of the component.

19. The method of claim 15, wherein the nickel-based superalloy further comprises up to about 2% of one or more of elements selected from a group consisting of titanium and niobium, by weight.

20. The method of claim 15, wherein the nickel-based superalloy further comprises up to about 2% of one or more of elements selected from a group consisting of molybdenum and tungsten, by weight.

* * * * *